July 22, 1958 M. O. FELIX 2,844,796

PHASE-MODULATORS

Filed Dec. 27, 1955

INVENTOR

Michael O. Felix

BY

Ralph B. Stewart

ATTORNEY

United States Patent Office 2,844,796

Patented July 22, 1958

2,844,796

PHASE-MODULATORS

Michael Otto Felix, Hamilton, Ontario, Canada, assignor to British Telecommunications Research Limited, Taplow, England Application December 27, 1955, Serial No. 555,676

Claims priority, application Great Britain January 4, 1955

5 Claims. (Cl. 332—23)

Figure 1:
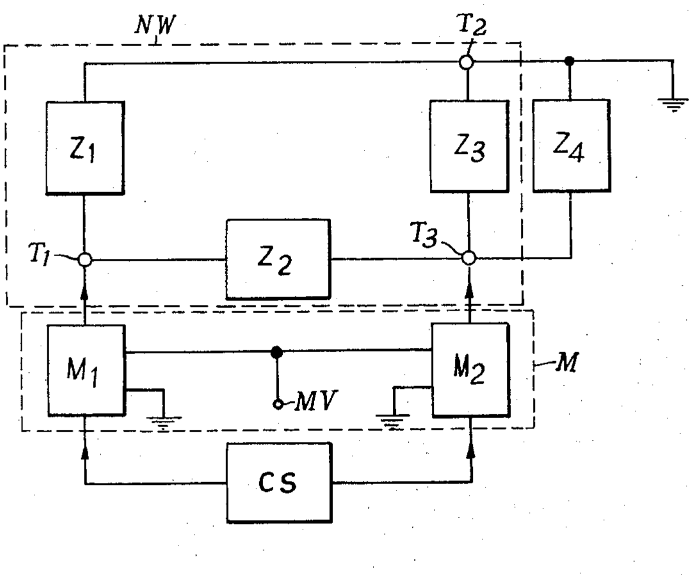

The present invention relates to modulators for phase-modulating electric oscillations and is concerned with phase modulators of the kind sometimes referred to as quadrature modulators. A quadrature modulator is a modulator whereby phase-modulation of a carrier oscillation by a modulating signal is effected by applying the modulating signal to amplitude-modulate the carrier and combining the sidebands of the amplitude-modulated carrier with the unmodulated carried phase-shifted by an angle such that a component of the combined oscillations is in the form of an oscillation of the carrier frequency phase-modulated by the modulating signal.

In a known phase modulator of the kind specified a source of carrier oscillations is connected to an output circuit through two parallel paths, one path including a balanced amplitude-modulator and the other including a phase-shifting network which phase-shifts the carrier by about $\pi/2$ radians.

A simpler phase-modulator of the kind specified has been proposed in which two identical carriers derived from a common source are amplitude-modulated in anti-phase relatively to one another by a modulating signal. The two amplitude-modulated carriers are fed to a bridge network of impedance elements arranged in such a manner that the oscillations appearing in an output circuit connected to the bridge network contain a component in the form of an oscillation of the carrier frequency phase-modulated by the modulating signal.

The object of the present invention is to provide a phase modulator of even simpler construction.

According to the present invention a phase-modulator comprises a network including a first impedance device $Z_1$ connected between first and second terminals, a second impedance device $Z_2$ connected between the first terminal and a third terminal, a third impedance device $Z_3$ connected between the second and third terminals, means for causing two like oscillatory carrier currents amplitude-modulated in opposite senses relatively to one another by a modulating signal to flow from the first terminal to the second terminal and from the third terminal to the second terminal respectively, and an output circuit connected across the third impedance device $Z_3$, the impedance devices $Z_1$ and $Z_2$ respectively including reactive impedances of opposite sign, at least one of the two impedance devices $Z_1$ and $Z_2$ including a resistive impedance component, and the impedance devices $Z_1$ and $Z_2$ being such that, in operation, the oscillatory voltages of carrier frequency generated across the impedance devices $Z_1$ and $Z_2$ differ in phase relatively to one another by an angle exceeding $\pi/2$ radians. It can be shown that the oscillations appearing in the output circuit of a modulator according to the invention contain a component in the form of an oscillation of the carrier frequency phase-modulated by the modulating signal. The condition that the oscillations generated across the impedance devices $Z_1$ and $Z_2$ at the carrier frequency differ in phase relatively to one another by an angle exceeding $\pi/2$ radians ignores phase shifts of $2\pi$ radians and integral multiples thereof in either oscillation. Thus, for example, the two oscillations may have phase angles of $\pi$ radians and $4\pi$ radians respectively relatively to the applied amplitude-modulated oscillations, whereby the phase angle between the two oscillations is $3\pi$ radians. Such an angle is for the purpose of the present invention equivalent to $\pi$ radians. If however the phase angles of the two oscillations are $\pi$ radians and $9\pi/4$ radians the effective phase difference is $\pi/4$ radians and does not meet the requirement that it must exceed $\pi/2$ radians.

The amplitude-modulation of the carrier oscillations is preferably effected by means of a single thermionic valve having a main control electrode, two electron-collecting electrodes and an auxiliary control electrode for controlling the flow of electrons differentially to the two electron-collecting electrodes. A single carrier is applied between the main control electrode and the cathode and the modulating signal is applied between the auxiliary control electrode and the cathode. Thus the currents of carrier frequency flowing in the leads to the two electron collecting electrodes are amplitude-modulated in opposite senses by the modulating signal. The impedance devices $Z_1$ and $Z_3$ are connected in the leads to the two electron collecting electrodes respectively and the impedance device $Z_2$ is connected between the two electron collecting electrodes. The valve may conveniently be a pentode in which the control grid constitutes the main control electrode, the anode and screen grid constitute the two electron-collecting electrodes respectively and the suppressor grid constitutes the auxiliary control electrode. It will be appreciated, however, that other arrangements may be employed for providing the two carriers amplitude-modulated in opposite senses by the modulating signal. In considering the impedance devices it may be necessary to take into account stray reactances associated therewith.

Figure 2:
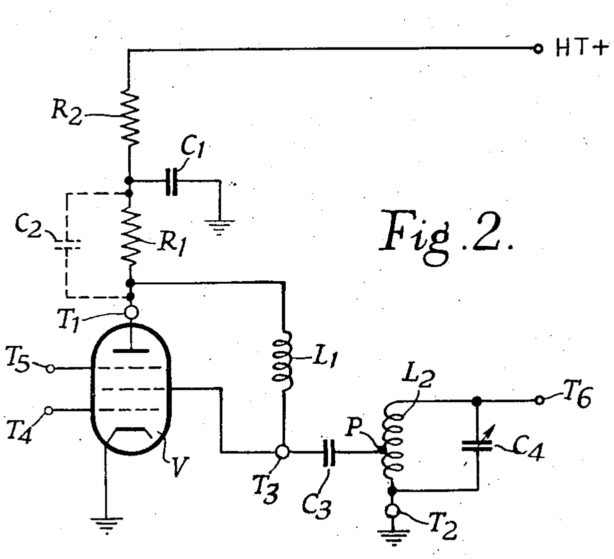

The invention will now be described, by way of example, with reference to the accompanying drawings, in which Fig. 1 is a block schematic diagram for illustrating the invention broadly, and Fig. 2 is a theoretical circuit diagram of a practical embodiment of the invention.

In Fig. 1 a source CS of carrier oscillations is connected to an amplitude-modulator shown within a broken line M. A modulating signal is applied to the modulator M from a terminal MV and the modulator is arranged in such a manner that it provides two outputs in the form of two like carriers amplitude-modulated in opposite senses respectively by the modulating signal applied to the terminal MV. For example two modulators $M_1$ and $M_2$ may be provided for this purpose.

The two amplitude-modulated carriers are applied to a network NW of impedance devices $Z_1$, $Z_2$, $Z_3$. The impedance device $Z_1$ is connected between two terminals $T_1$ and $T_2$, the impedance device $Z_2$ is connected between the terminal $T_1$ and a third terminal $T_3$, and the impedance device $Z_3$ is connected between the terminals $T_2$ and $T_3$. One of the amplitude-modulated carriers is applied between the terminals $T_1$ and $T_2$ and the other is applied between the terminals $T_3$ and $T_2$. An output circuit represented by an impedance device $Z_4$ is connected between the terminals $T_2$ and $T_3$.

The impedance devices $Z_1$ and $Z_2$ are arranged to contain reactance elements of opposite reactances, one of these two devices is arranged to contain resistive impedance and the phase angle between the oscillations generated across the impedance devices $Z_1$ and $Z_2$ at the carrier frequency is arranged to be more than $\pi/2$ radians. The value of $Z_3$ may be varied to obtain an impedance match between the network NW and the load $Z_4$.

Referring to Fig. 2, this is a theoretical circuit diagram of a practical form of the invention. A carrier oscillation is applied to the control grid of a pentode valve V from a terminal $T_4$ and a signal for modulating the carrier is applied from a terminal $T_5$ to the suppressor grid of the pentode. Two resistors $R_1$ and $R_2$ are connected in series between the anode of the pentode and the positive terminal HT+ of a source of anode current. The junction of the resistors $R_1$ and $R_2$ is connected to earth through a capacitor $C_1$. Stray capacitance associated with the resistor $R_1$ is shown in broken lines at $C_2$.

An inductor $L_1$ is connected between the anode and screen grid of the pentode and the screen grid is connected through a capacitor $C_3$ to a tap P on a further inductor $L_2$. The lower end (in the drawing) of the inductor is connected to earth and a further capacitor $C_4$ is connected across the inductor $L_2$. The terminals $T_1$, $T_2$ and $T_3$ in Fig. 2 correspond to those of like reference in Fig. 1.

The resistor $R_2$ and capacitor $C_1$ act as a decoupling circuit whereby at the radio frequencies concerned the upper end (in the drawing) of the resistor $R_1$ is effectively connected to earth and hence to the terminal $T_2$.

The valve V acts as an amplitude-modulator and the radio-frequency components of the anode and screen currents are amplitude-modulated in opposite senses respectively by the modulating signal applied to the suppressor grid from the terminal $T_5$.

The resistor $R_1$ and its associated stray capacitance $C_2$ constitute the impedance device $Z_1$ of Fig. 1, the inductor $L_1$ constitutes the impedance device $Z_2$ and the resonant circuits $L_2$, $C_4$ constitute the impedance device $Z_3$. The resonant circuit is tuned to the carrier frequency.

Thus the impedance device $Z_1$ has both resistance and capacitive reactance and the impedance device $Z_2$ has inductive roactance. The tap P on the inductor $L_2$ is adjusted to provide an impedance match for maximum power output. The output is taken between the terminal $T_6$ and earth.

It will be understood that the capacitance between the control grid and screen grid of the pentode V may provide sufficient coupling between the input and output circuits to be troublesome at high carrier frequencies. This may be overcome by any suitable means which will be apparent to those skilled in the art. For example an extra, earthed screen grid may be used between the control grid and screen grid shown. Another possible arrangement would be to earth the control grid and apply the carrier to vary the cathode potential of the valve. Theoretically this causes the carrier to appear between the suppressor grid and cathode as well as between the control grid and cathode. By the choice of a suitable valve having a control grid base considerably less than the suppressor grid base the effect of the carrier appearing between the suppressor grid and cathode is of second order.

I claim:

1. A phase modulator comprising a network of impedance devices, first, second and third terminals on said network, a first impedance device $Z_1$ connected between said first and second terminals, a second impedance device $Z_2$ connected between said first and third terminals, a third impedance device $Z_3$ connected between said second and third terminals, means providing two oscillatory carrier currents of the same frequency but amplitude-modulated in opposite senses, connections for passing one of said amplitude-modulated currents through the network from the first terminal to the second terminal, connections for passing the other of said amplitude-modulated currents through the network from the third terminal to the second terminal, and an output circuit connected across said third impedance device $Z_3$, the impedance devices $Z_1$ and $Z_2$ respectively including reactive impedances of opposite sign, at least one of the two impedance devices $Z_1$ and $Z_2$ including a resistive impedance component and the impedance devices $Z_1$ and $Z_2$ having phase angles which differ from one another by more than $\pi/2$ radians.

2. A phase modulator comprising a network of impedance devices, first, second and third terminals on said network, a first impedance device $Z_1$ connected between said first and second terminals, a second impedance device $Z_2$ connected between said first and third terminals, a third impedance device $Z_3$ connected between said second and third terminals, means providing two oscillatory carrier currents of the same frequency, a source of modulating voltage, means to apply said modulating voltage to amplitude-modulate said carrier currents in opposite senses respectively, connections for passing one of said amplitude-modulated carrier currents through said network from the first terminal to the second terminal, connections for passing the other of said amplitude-modulated carrier currents through the network from the third terminal to the second terminal, and an output circuit connected between said second and third terminals, one of said impedance devices $Z_1$ and $Z_2$ having a resistive and a reactive component, the other of said impedance devices $Z_1$ and $Z_2$ having a reactive component of the opposite sign to the reactive component in the said one of the impedance devices $Z_1$ and $Z_2$, and the impedance devices $Z_1$ and $Z_2$ generating voltages at the carrier frequency which differ from one another by a phase angle exceeding $\pi/2$ radians.

3. A phase modulator comprising an electron discharge valve having a cathode, a main control electrode, two electron collecting electrodes and an auxiliary control electrode for controlling the flow of current to the two electron collecting electrodes differentially, a source of carrier oscillations connected to the main control electrode of said valve, a source of modulating voltage connected to the auxiliary control electrode of said valve, a source of direct current, a first impedance device $Z_1$ connected between one of said electron collecting electrodes and the positive terminal of said source, a second impedance device $Z_2$ connected between said electron collecting electrodes, and a third impedance device $Z_3$ connected between the other of said electron collecting electrodes and the positive terminal of said source of direct current, a connection from the negative terminal of said source of direct current to the cathode of said valve, and an output circuit connected between said second and third terminals, at least one of the impedance devices $Z_1$ and $Z_2$ including a resistive component, the two impedance devices $Z_1$ and $Z_2$ including reactive components of opposite sign and the phase angles of the two impedance elements $Z_1$ and $Z_2$ differing from one another by more than $\pi/2$ radians.

4. A phase modulator comprising an electron discharge valve having an anode, a cathode and first, second and third control electrodes, the first control electrode being nearest the cathode, the third control electrode being nearest the anode and the second control electrode being intermediate the first and third control electrodes, a source of oscillatory carrier voltage connected to vary the potential between the first control electrode and the cathode, a source of modulating voltage connected to vary the potential of the third control electrode relatively to the cathode, a source of direct voltage, a first impedance device connected between the anode and the positive terminal of said source of direct current, a second impedance device connected between the anode and the second control electrode, a third impedance device connected between the second control electrode and the positive terminal of said source of direct current, and an output circuit connected across said third impedance device, one of said first and second impedance devices including a resistive component, said first and second impedance devices including reactive components of opposite sign and the phase angles of said first and second impedance devices differing from one another by more than $\pi/2$ radians.

5. A phase modulator comprising an electron discharge valve having an anode, a cathode, a control grid, a screen grid and a suppressor grid, a resistor connected between the anode of said valve and the positive terminal of a source of direct current whose negative terminal is connected to the cathode of said valve, an inductor connected between the anode and screen grid of said valve, a resonant circuit having one terminal connected to the cathode of said valve and a capacitor connected between the screen grid of said valve and another terminal of said resonant circuit.

References Cited in the file of this patent

UNITED STATES PATENTS

| | | |
|---|---|---|
| 2,408,684 | Roberts | Oct. 1, 1946 |
| 2,458,760 | Andersen | Jan. 11, 1949 |